US012371915B1

(12) United States Patent
Henry

(10) Patent No.: US 12,371,915 B1
(45) Date of Patent: Jul. 29, 2025

(54) SNOW FORT MAKING KIT

(71) Applicant: Russell Henry, Caledon (CA)

(72) Inventor: Russell Henry, Caledon (CA)

( * ) Notice: Subject to any disclaimer, the term of this patent is extended or adjusted under 35 U.S.C. 154(b) by 276 days.

(21) Appl. No.: 18/126,763

(22) Filed: Mar. 27, 2023

(51) Int. Cl.

| | |
|---|---|
| ***E04G 11/06*** | (2006.01) |
| ***A63H 33/00*** | (2006.01) |
| ***B30B 11/02*** | (2006.01) |
| ***E04G 11/22*** | (2006.01) |
| ***F25C 5/14*** | (2006.01) |
| *E04B 1/32* | (2006.01) |

(52) U.S. Cl.
CPC ........... *E04G 11/06* (2013.01); *A63H 33/001* (2013.01); *B30B 11/02* (2013.01); *E04G 11/22* (2013.01); *F25C 5/14* (2013.01); *A63H 33/008* (2013.01); *E04B 2001/327* (2013.01)

(58) Field of Classification Search
CPC .... A63H 33/001; A63H 33/008; B30B 11/02; E04B 2001/327; E04G 11/06; E04G 11/22; F25C 5/14
See application file for complete search history.

(56) References Cited

U.S. PATENT DOCUMENTS 1,610,121 A * 12/1926 Dickinson ............ A63H 33/001 425/DIG. 57
3,059,279 A 10/1962 Rossi
3,816,048 A * 6/1974 Berry ........................ F25C 5/14 425/DIG. 57
4,154,423 A * 5/1979 Crock ................... B28B 7/0029 249/117
4,164,341 A 8/1979 McComb
D384,960 S 10/1997 Kistler
5,817,248 A * 10/1998 Forlini .................. B28B 7/0044 249/161

(Continued)

FOREIGN PATENT DOCUMENTS

AT 7858 U1 * 10/2005
CA 2640095 A1 * 3/2009 ............ E04B 1/3211

(Continued)

OTHER PUBLICATIONS

Snow Brick Mold for Outdoor Fun—Igloo Fortress. Product Listing [online]. Cults3d. [retrieved on Mar. 22, 2022]. Retrieved from the Internet: <URL:https://cults3d.com/en/3d-model/gadget/snow-brick-mold-for-outdoor-fun-igloo-fortress>.

*Primary Examiner* — Jessie T Fonseca
(74) *Attorney, Agent, or Firm* — Cramer Patent & Design, PLLC.; Aaron R. Cramer

(57) ABSTRACT

The snow fort making kit may comprise a plurality of form panels and a packing tool. The plurality of form panels may be coupled to each other to assemble a form for making a snow structure out of packed snow. As a non-limiting example, the snow structure may be a snow fort. The form may comprise straight walls and/or walls with turns. Snow may be placed inside of the form and packed using the packing tool. The form may then be removed, disassembled, and reused to extend a wall. The plurality of form panels may comprise multiple sizes for use on different parts of the wall. As non-limiting examples, the plurality of form panels may comprise at least an end panel for use at the end of the wall and a side panel for use on the side of the wall.

19 Claims, 6 Drawing Sheets

(56) References Cited

U.S. PATENT DOCUMENTS

| | | | | |
|---|---|---|---|---|
| 6,210,142 | B1 * | 4/2001 | Huesers | E04G 11/04 425/441 |
| D645,887 | S * | 9/2011 | Schlichting | D15/135 |
| 9,474,986 | B2 | 10/2016 | Drylie | |
| 10,080,979 | B2 | 9/2018 | Lane | |
| D884,090 | S | 5/2020 | Lane | |
| 10,807,014 | B2 | 10/2020 | Fedrick | |
| 11,009,276 | B1 * | 5/2021 | Clark | B30B 11/02 |
| 11,311,025 | B2 * | 4/2022 | Rupp | A23G 9/221 |
| 11,885,552 | B2 * | 1/2024 | Youngstrom | F25C 3/00 |
| 11,980,830 | B1 * | 5/2024 | Putnam | B29C 43/006 |
| 2009/0078849 | A1 * | 3/2009 | Goertzen | E04B 1/3211 249/18 |
| 2010/0230842 | A1 * | 9/2010 | Pendergast | B44C 3/04 264/33 |
| 2013/0069265 | A1 * | 3/2013 | Djoboulian | E04G 11/22 264/33 |
| 2021/0379855 | A1 * | 12/2021 | Clark | B30B 11/02 |

FOREIGN PATENT DOCUMENTS

| | | | | |
|---|---|---|---|---|
| CA | 2753374 | A1 * | 3/2013 | E04G 11/06 |
| GB | 2503047 | A * | 12/2013 | E04B 1/169 |

* cited by examiner

SNOW FORT MAKING KIT

RELATED APPLICATIONS

None.

FIELD OF THE INVENTION

The present invention relates generally to a kit and more specifically to a snow fort making kit.

BACKGROUND OF THE INVENTION

More and more people are enjoying outdoor wintertime activities each and every year. Sports such as skating, tobogganing, skiing, snowboarding and the like gain the favor of active people every time it snows. However, such activities are usually appropriate only for adults and older children. Young children and their parents typically are only to take part in sledding or building objects made of snow such as snowmen. Other structures made of snow such as forts, igloos, and the like are much more difficult to build, meaning that the child and adult alike quickly loose interest. Even if they persist with hours of work, a small structure, only a couple of feet high, is the end result. Accordingly, there exists a need for a means by which various types of larger snow structures can be built in a shorter period of time to allow for increased wintertime fun for the whole family. The development of the Snow Fort Making Kit fulfills this need.

SUMMARY OF THE INVENTION

To achieve the above and other objectives, the present invention provides for snow fort making kit which consists of several components, including form panels that are connected to make a form for packing snow into a structure, a panel size adjuster release, and interconnect notches for coupling the form panels. The kit also includes stabilizer arms and a packing tool with a handle and packing head. The form can be used to make a snow fort with straight or turning walls and can be disassembled and reused to extend the walls.

The end panel includes an aperture for the user's foot to force it into the packed snow. The upper panel section can be repositioned by disengaging the panel size adjuster release. The interconnect notches have pass-through bores that can be fixedly and rotatably coupled with a pin. The stabilizer arms are extendable and retractable by sliding the arm sections. The second stabilizer arm is a strap that can engage a slot on the side panel to securely couple it to the end panel. The packing tool includes a handle coupler for ease of transportation and storage.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
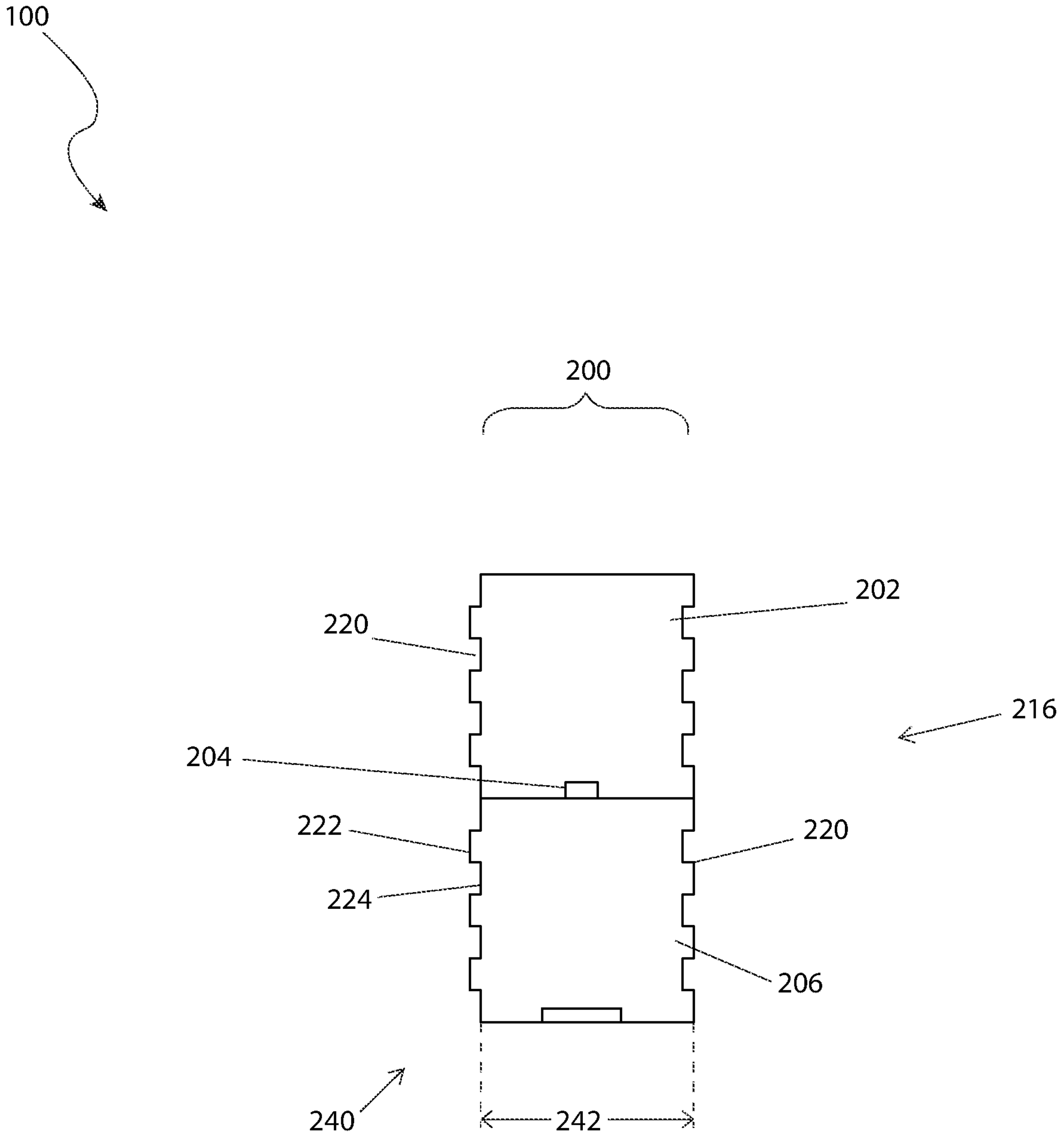
FIG. 1 is a front view of a snow fort making kit, according to an embodiment of the present invention, illustrating an end panel in the retracted height position.
Figure 2:
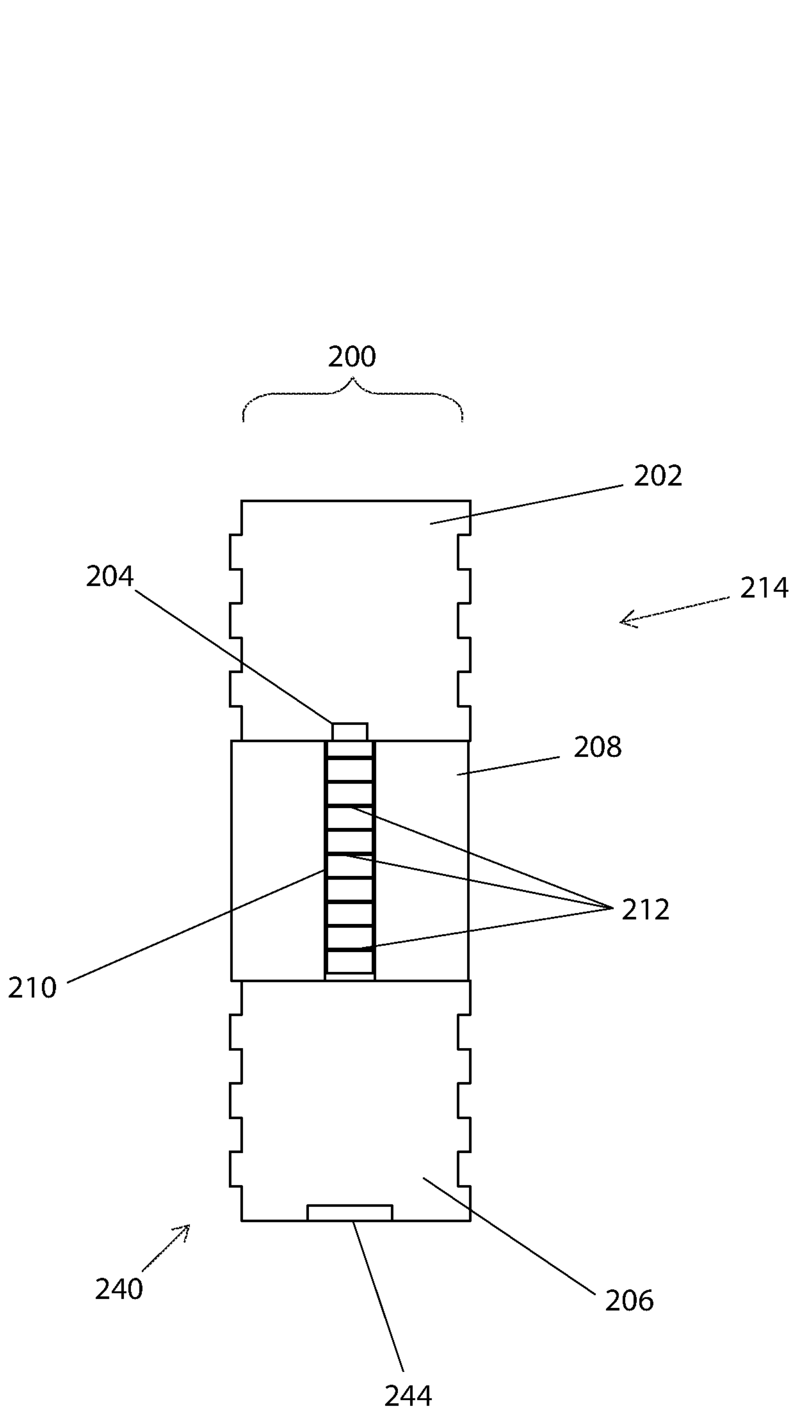
FIG. 2 is a front view of a snow fort making kit, according to an embodiment of the present invention, illustrating an end panel in the extended height position.
Figure 3:
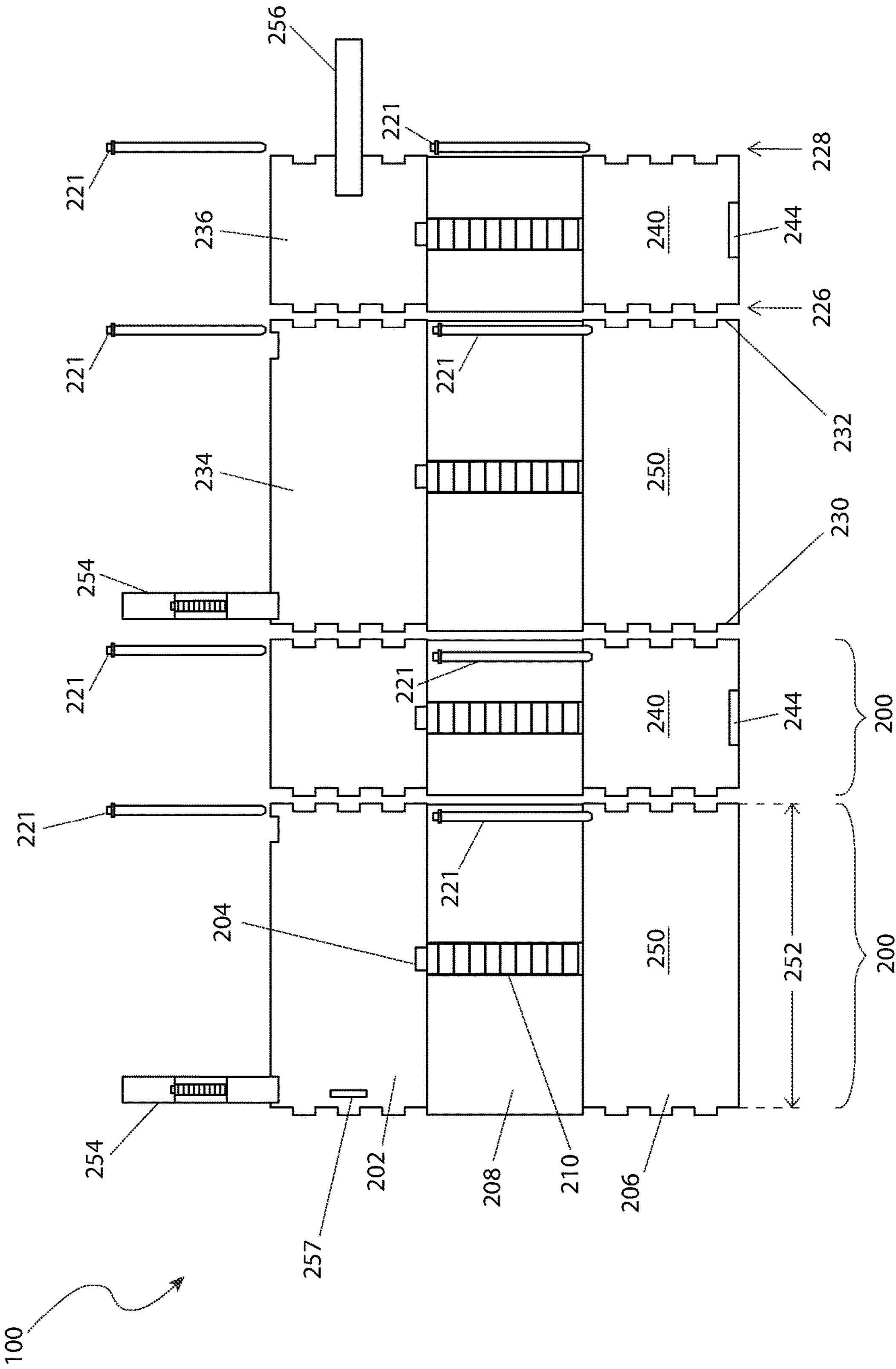
FIG. 3 is a front view of a snow fort making kit, according to an embodiment of the present invention, illustrating a plurality of form panels comprising end panels and side panels.
Figure 4:
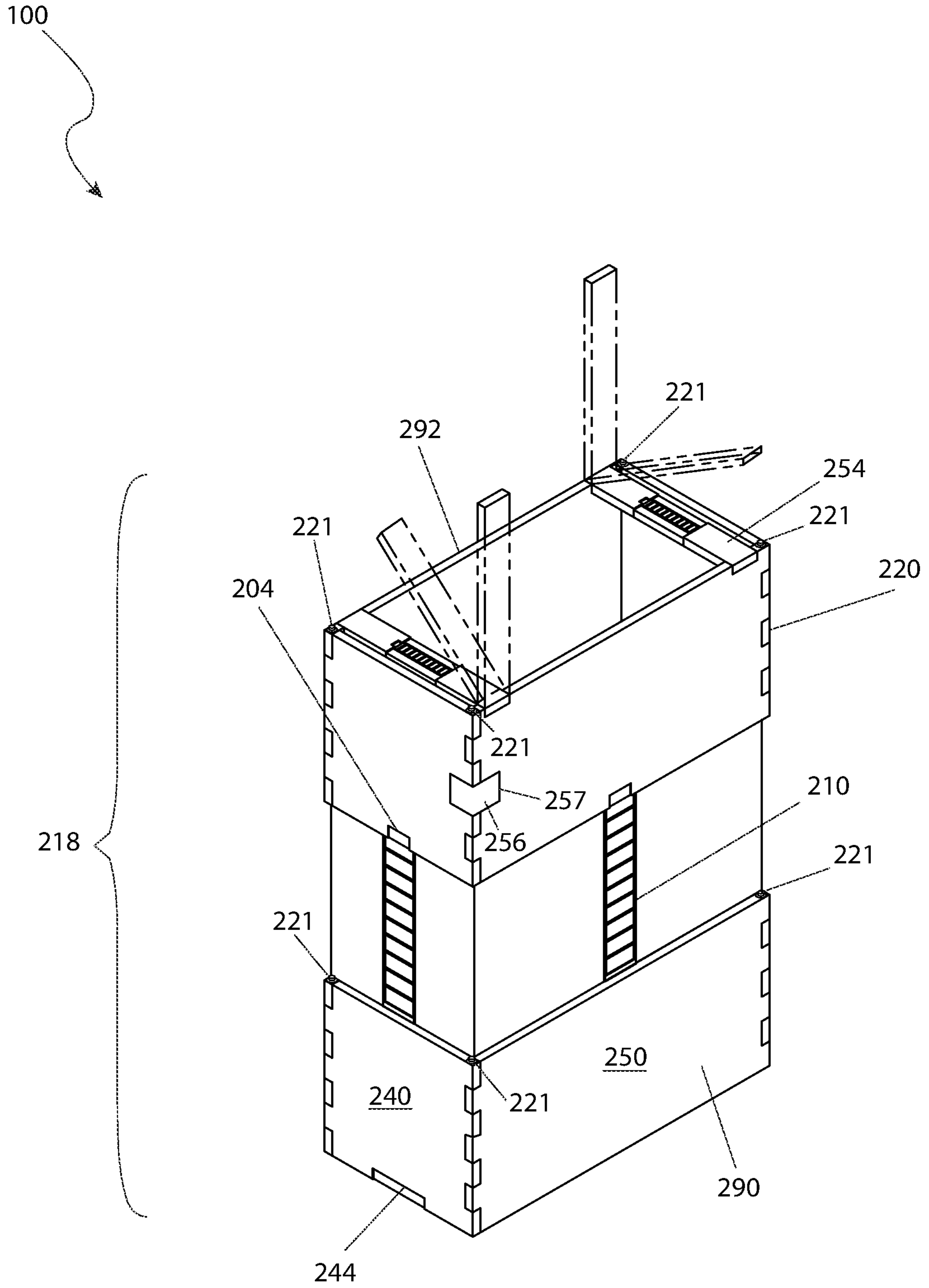
FIG. 4 is an isometric view of a snow fort making kit, according to an embodiment of the present invention, illustrating end panels and side panels assembled into a form.
Figure 5:
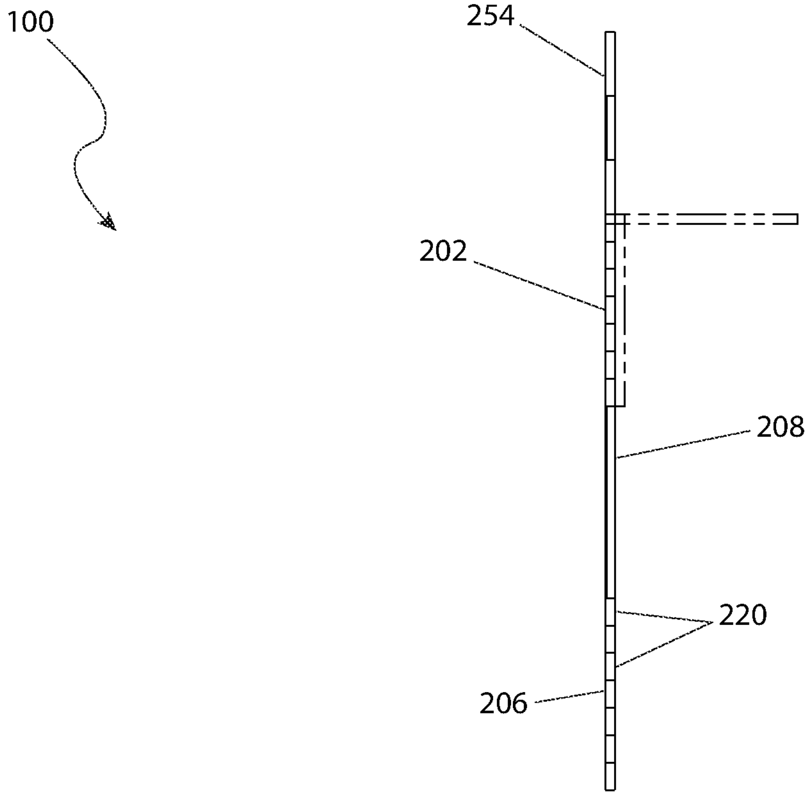
FIG. 5 is a side view of a snow fort making kit, according to an embodiment of the present invention, illustrating a side panel.
Figure 6:
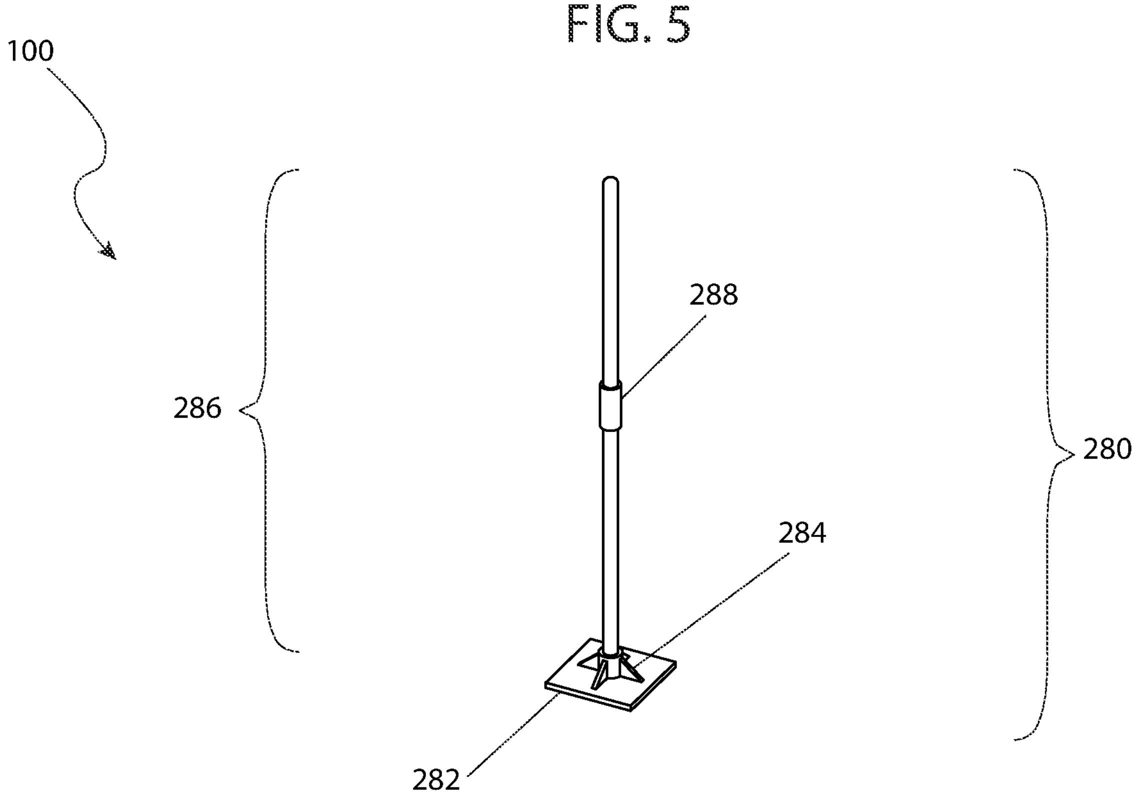
FIG. 6 is an isometric view of a snow fort making kit, according to an embodiment of the present invention, illustrating a packing tool.
Figure 7:
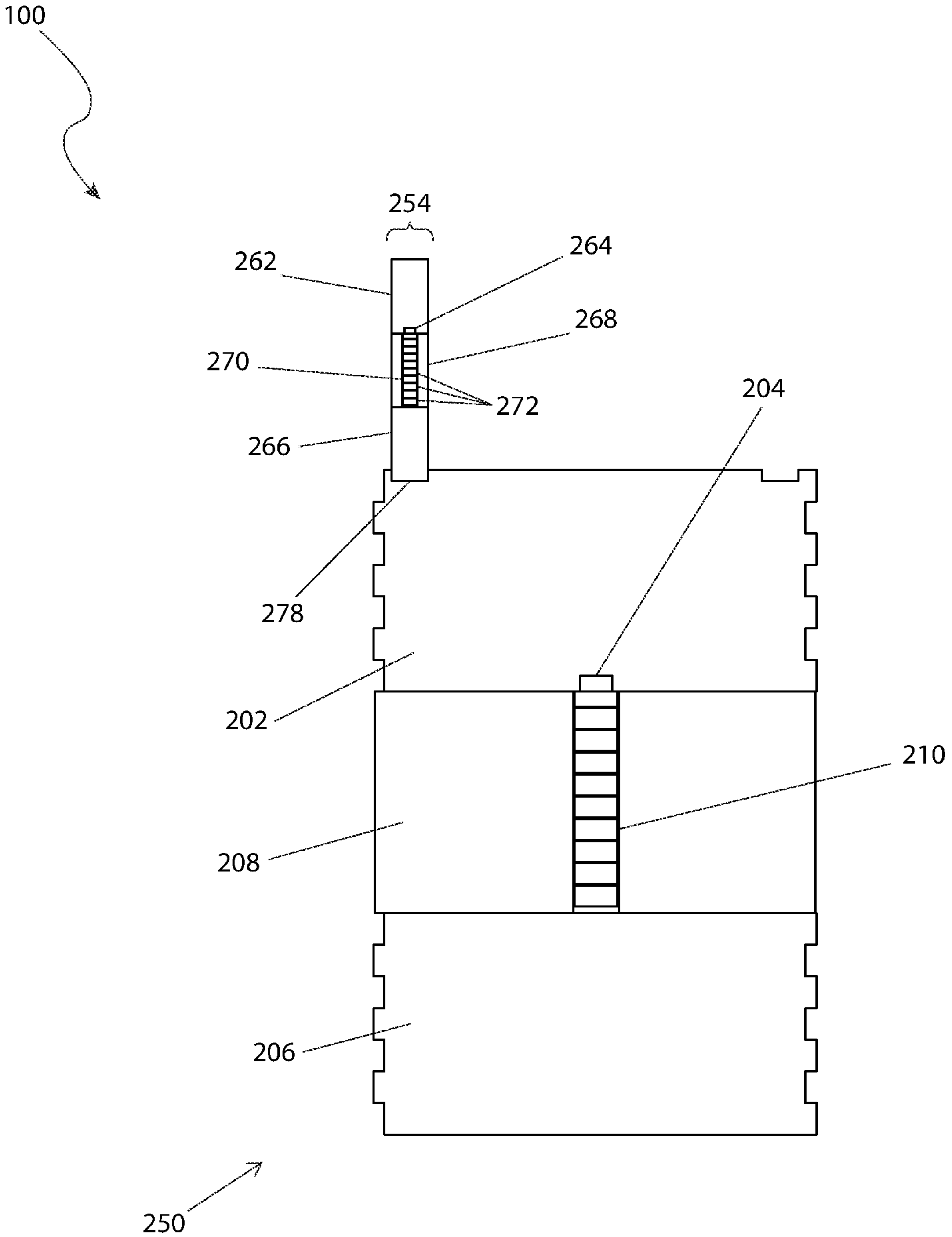
FIG. 7 is a front view of a snow fort making kit, according to an embodiment of the present invention, illustrating a side panel comprising a first stabilizer arm and a second stabilizer arm.

100 snow fort making kit
200 form panel
202 upper panel section
204 panel size adjuster release
206 lower panel section
208 center panel section
210 panel size adjuster
212 panel size stopping position
214 extended height position
216 retracted height position
218 form
220 interconnect notch
221 pin
222 first section
224 second section
226 left side notch
228 right side notch
230 lowest first position
232 lowest second position
234 first form panel
236 second form panel
240 end panel
242 end panel width
244 end panel foot aperture
250 side panel
252 side panel width
254 first stabilizer arm
256 second stabilizer arm
257 slot
262 first arm section
264 arm length adjuster release
266 second arm section
268 center arm section
270 arm length adjuster
272 arm length stopping position
278 arm hinge
280 packing tool
282 packing head
284 handle coupler
286 handle
288 handle joint
290 first side panel
292 second side panel

DESCRIPTION OF THE INVENTION

The present invention is directed to a snow fort making kit (herein described as the "invention") 100. The invention 100 may comprise a plurality of form panels 200 and a packing tool 280. The plurality of form panels 200 may be coupled to each other to assemble a form 218 for making a snow structure out of packed snow. As a non-limiting example, the snow structure may be a snow fort. The form 218 may comprise straight walls and/or walls with turns. Snow may be placed inside of the form 218 and packed using the packing tool 280. The form 218 may then be removed, disassembled, and reused to extend a wall. The plurality of form panels 200 may comprise multiple sizes for use on different parts of the wall. As non-limiting examples, the plurality of form panels 200 may comprise at least an end panel 240 for use at the end of the wall and a side panel 250 for use on the side of the wall.

An individual form panel 200 may comprise an upper panel section 202, a lower panel section 206, and a center panel section 208. The lower panel section 206 may be coupled to the center panel section 208. The upper panel section 202 may be slidably coupled to the center panel section 208. The individual form panel 200 may extend from a retracted height position 216 to an extended height position 214 by sliding the upper panel section 202 away from the lower panel section 206 and may retract from the extended height position 214 to the retracted height position 216 by sliding the upper panel section 202 towards the lower panel section 206. A panel size adjuster release 204 on the upper panel section 202 and a panel size adjuster 210 on the center panel section 208 may hold the individual form panel 200 at the retracted height position 216, at the extended height position 214, or at one of a plurality of positions between the retracted height position 216 and the extended height position 214.

The upper panel section 202 may have the same height as the lower panel section 206 making the height of the form panel 200 substantially twice the height of the lower panel section 206 when the form panel 200 is in the retracted height position 216. When the form panel 200 is moved to the extended height position 214, the height of the form panel 200 substantially three times (3×) the height of the lower panel section 206.

The panel size adjuster 210 on the center panel section 208 may comprise a plurality of panel size stopping positions 212. The panel size adjuster release 204 on the upper panel section 202 may engage any of the plurality of panel size stopping positions 212 to hold the upper panel section 202 at a fixed position. The panel size adjuster release 204 may be adapted to be disengaged from the plurality of panel size stopping positions 212 by a user so that the upper panel section 202 may be repositioned. In some embodiments, the user may pull on the panel size adjuster release 204 while repositioning the upper panel section 202.

The lateral sides of the individual form panel 200 may comprise interconnect notches 220 that may be operable to couple the individual form panel 200 to other form panels 200. Right side notches 228 on a first form panel 234 may couple to left side notches 226 on a second form panel 236. The first form panel 234 and the second form panel 236 may be coupled such that the first form panel 234 and the second form panel 236 are coplanar in order to make a straight wall. The first form panel 234 and the second form panel 236 may couple at an angle to form a wall section that bends.

The interconnect notches 220 may comprise a plurality of rectangular first sections 222 and a plurality of rectangular second sections 224. An individual first section 222 on the first form panel 234 may engage an individual second section 224 on the second form panel 236. In the exemplary embodiment, each of the interconnect notches 220 has a pass-through bore (e.g., each of the first sections 222 and second sections 224). Each pass-through bore of a given first section 222 or second section 224 is coaligned with a pass-through bore of an adjacent first or second section 222, 224, thereby ensuring that the interconnect notches 220 have a continuous pass-through bore. A pin 221 is provided to fully or partially engage with the coaligned pass-through bores of a coaligned set of interconnect notches 220 to fixedly and rotatably couple the first form panel 234 to the second form panel 236. Also, as a non-limiting example, an individual first section 222 may engage an individual second section 224 via a friction fit.

The left side notches 226 must mesh with the right-side notches 228 such that the individual first sections 222 meet the individual second sections 224 as the plurality of form panels 200 are coupled with pins 221 passing through the coaligned bores of the first sections 222 and second sections 224. As a non-limiting example, a lowest first position 230 of the left side notches 226 must align with a lowest second position 232 of the right-side notches 228. A person of ordinary skill in the art will recognize that the positions, ordering, and dimensions of the interconnect notches 226, 228 may be changed and that such changes will fall within the spirit and scope of the present invention as defined in the claims which follow.

The end panel 240 may comprise an end panel width 242 that may be substantially the same as the height of the lower panel section 206. The end panel 240 may therefore be said to have a width of one (1) unit and a height of two (2) units when in the retracted height position 216. The end panel 240 may similarly be said to have a width of one (1) unit and a height of three (3) units when in the extended height position 214. Because of the one (1) unit width, the end panel 240 may be selected to join parallel form panels at the ends of the wall.

The end panel 240 may comprise an end panel foot aperture 244. The end panel foot aperture 244 may be an aperture located at the bottom center of the end panel 240. The end panel foot aperture 244 may be adapted a user's foot to be inserted in order to force the end panel 240 down into the ground surface or snow.

The side panel 250 may comprise a side panel width 252 that may be substantially two times (2×) the height of the lower panel section 206. The side panel 250 may therefore be said to have a width of two (2) units and a height of two (2) units when in the retracted height position 216. The side panel 250 may similarly be said to have a width of two (2) units and a height of three (3) units when in the extended height position 214.

Multiples of the side panels 250 may be coupled together in parallel to form the sides of the wall. The snow packed between the parallel form panels 250 may tend to push the parallel form panels 250 apart. The side panel 250 may therefore comprise a first stabilizer arm 254 to brace the parallel form panels 250. The first stabilizer arm 254 may be hingedly coupled to the top left of the side panel 250 via an arm hinge 278. The first stabilizer arm 254 on a first side panel 290 may be pivoted to a horizontal position and the distal end of the first stabilizer arm 254 may be detachably coupled to the top of a second side panel 292 which is parallel to the first side panel 290 to prevent separation of the tops of the first side panel 290 and the second side panel 292.

In some embodiments, a second stabilizer arm 256 may be hingedly coupled, integral with, or attachable to a right side of the end panel 240. A slot 257 may be formed on a side panel 250. The relative vertical positions of the second stabilizer arm 256 on the end panel 240 and the slot 257 on a side panel 250 are preferably coaligned. The second stabilizer arm 256 may be a strap having a size and the capability of engaging the slot 257 of a side panel 150, such that the engagement securely couples the end panel 240 to the side panel 250. As a non-limiting example, the second stabilizer arm 256 of the end panel 240 may be coupled to the slot 257 of the side panel 250 before placing the snow into the form 218.

The first stabilizer arm 254 may comprise a first arm section 262, a second arm section 266, and a center arm section 268. The second arm section 266 may be coupled to the center arm section 268. The first arm section 262 may be slidably coupled to the center arm section 268. The first stabilizer arm 254 may extend from a retracted length to an extended length by sliding the first arm section 262 away from the second arm section 266 and may retract from the extended length to the retracted length by sliding the first arm section 262 towards the second arm section 266. An arm length adjuster release 264 on the first arm section 262 and an arm length adjuster 270 on the center arm section 268 may hold the first stabilizer arm 254 at the retracted length, at the extended length, or at one (1) of a plurality of positions between the retracted length and the extended length.

The first arm section 262 may have the same length as the second arm section 266 making the length of the first stabilizer arm 254 substantially twice (2×) the length of the second arm section 266 when the first stabilizer arm 254 is in the retracted length. When the first stabilizer arm 254 is moved to the extended length, the length of the first stabilizer arm 254 substantially three times (3×) the length of the second arm section 266.

The arm length adjuster 270 on the center arm section 268 may comprise a plurality of arm length stopping positions 272. The arm length adjuster release 264 on the first arm section 262 may engage any of the plurality of arm length stopping positions 272 to hold the first arm section 262 at a fixed position. The arm length adjuster release 264 may be adapted to be disengaged from the plurality of arm length stopping positions 272 by the user so that the first arm section 262 may be repositioned. In some embodiments, the user may pull on the arm length adjuster release 264 while repositioning the first arm section 262.

The packing tool 280 may be operable to pack the snow down within the form 218. The packing tool 280 may be adapted to be manually operated by the user. The packing tool 280 may comprise a packing head 282 and a handle 286. The packing head 282 may be square and may comprise a horizontally oriented planar surface on the bottom of the packing head 282 for pressing down on the snow. The length of each side of the packing head 282 may be less than one (1) unit as defined by the end panel 240 such that the packing head 282 may fit within the form 218 that are terminated by the end panel 240. The top center of the packing head 282 may comprise a handle coupler 284. The handle 286 may detachably couple to the packing head 282 via the handle coupler 284. In some embodiments, the handle 286 may separate at a handle joint 288 for ease of transportation and storage.

In use, two (2) side panels 250 may be positioned parallel to each other and joined at a first end by an end panel 240 to begin a form 218. This occurs by aligning either the first section 222 or second section 224 of the interconnecting notches 220 of a first form panel 234 to the remainder first section 222 or second section 224 of the second form panel 236. Securing these together is a plurality of pins 221, each securing an individual one (1) thereof. The first stabilizer arm 254 may be coupled between the side panels 250 to retain the separation distance of the side panels 250. A second end of the side panels 250 may be closed off using another one (1) of the end panels 240 which may have a second stabilizer arm 256 capable of removable secure attachment to a slot 257 of one of the adjacent side panels 250. Alternately, the wall may be extended by coupling more of the individual side panels 250. The wall may be built to be straight or to bend at certain locations. As a non-limiting example, to bend the wall, the individual form panels 200 may be coupled at right angles or at oblique angles to change the direction of the wall. The wall may even branch. As a non-limiting example, one (1) side of the wall may turn while the other side continues straight and a ninety degree (90°) corner may be placed to continue both the turn and the straight segment of the wall. The pins 221 of a single side of conjoined form panels 200 may be removed, leaving either of the form panels 200 (e.g., an end panel 240 or a side panel 250) to act as a swinging door. Once the form 218 is complete, snow may be shoveled into the form 218 and the snow may be packed down using the packing tool 280. Finally, the form 218 may be dissembled and removed, leaving only a snow fort.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A snow fort making kit, comprising:

a plurality of form panels each having an upper panel section, a lower panel section, and a center panel section, the form panels are coupled to each other and are adapted to assemble a form for making a snow structure out of a plurality of packed snow;

a panel size adjuster release disposed on the upper panel section of one of the form panels;

a panel size adjuster disposed on the center panel section configured to hold each of the form panels at a retracted height position or at a extended height position;

a plurality of interconnect notches disposed on a plurality of lateral sides of each of the form panels that are operable to couple one of the form panels to another one of the form panels;

a first stabilizer arm includes a first arm section, a second arm section, and a center arm section;

a second stabilizer arm hingedly coupled to a right side of an end panel; and a packing tool having a packing head and a handle, the packing tool packs the plurality of packed snow down within the form.

2. The snow fort making kit, according to claim 1, wherein the snow structure is a snow fort.

3. The snow fort making kit, according to claim 1, wherein the form includes a plurality of straight walls and/or a plurality of walls with turns.

4. The snow fort making kit, according to claim 3, wherein the form is configured to be removed, disassembled, and reused to extend one of the walls.

5. The snow fort making kit, according to claim 1, wherein the form panels each include an end panel for use at an end of the wall and a side panel for use on a side of the wall.

6. The snow fort making kit, according to claim 5, wherein the end panel includes an end panel foot aperture located at a bottom center of the end panel adapted to a user's foot to be inserted in order to force the end panel down into the plurality of packed snow.

7. The snow fort making kit, according to claim 1, wherein the lower panel section is coupled to the center panel section and the upper panel section is slidably coupled to the center panel section.

8. The snow fort making kit, according to claim 1, wherein each of the form panels extend from the retracted height position to the extended height position by sliding the upper panel section away from the lower panel section and retract from the extended height position to the retracted height position by sliding the upper panel section towards the lower panel section.

9. The snow fort making kit, according to claim 1, wherein the panel size adjuster release is one of a plurality of positions between the retracted height position and the extended height position.

10. The snow fort making kit, according to claim 1, wherein the upper panel section has a height equal to the lower panel section making a height of the respective form panel substantially twice the height of the lower panel section when the respective form panel is in the retracted height position.

11. The snow fort making kit, according to claim 1, wherein the panel size adjuster release is adapted to be disengaged from panel size stopping positions by a user so that the upper panel section is repositioned.

12. The snow fort making kit, according to claim 1, wherein the interconnect notches include a plurality of rectangular first sections and a plurality of rectangular second sections.

13. The snow fort making kit, according to claim 1, wherein a first one of the plurality of form panels comprises a plurality of right side notches of the plurality of interconnect notches, and a second one of the plurality of form panels comprises a plurality of left side notches of the plurality of interconnect notches, wherein each of the right side notches of the first form panel is configured to couple with a corresponding one of the left side notches of the second form panel, and wherein the first form panel and the second form panel are coupled in a coplanar orientation to form a straight wall.

14. The snow fort making kit, according to claim 1, wherein each of the interconnect notches have a pass-through bore of first sections and second sections that are coaligned.

15. The snow fort making kit, according to claim 14, further comprising a pin is provided to fully or partially engage with the coaligned pass-through bores of a coaligned set of interconnect notches to fixedly and rotatably couple a first one of the plurality of form panels to a second one of the plurality of form panels.

16. The snow fort making kit, according to claim 1, wherein the first stabilizer arm extends from a retracted length to an extended length by sliding the first arm section away from the second arm section and retract from the extended length to the retracted length by sliding the first arm section towards the second arm section.

17. The snow fort making kit, according to claim 1, wherein the second arm section is coupled to the center arm section and the first arm section is slidably coupled to the center arm section.

18. The snow fort making kit, according to claim 1, wherein the second stabilizer arm is a strap having a size and the capability of engaging a slot disposed on the side panel, such that the engagement securely couples the end panel to a side panel.

19. The snow fort making kit, according to claim 1, wherein a top center of the packing head includes a handle coupler to detachably couple to the handle to the packing head for ease of transportation and storage.

* * * * *